United States Patent [19]

Uttke et al.

[11] Patent Number: 5,369,833
[45] Date of Patent: Dec. 6, 1994

[54] OFFSET SIDEBAR FLIGHT SUPPORTING CHAIN

[76] Inventors: Russell H. C. Uttke, 4850 Stratford Dr., Greendale, Wis. 53129; Jon C. Utz, 15950 W. Allison Dr., New Berlin, Wis. 53151; Chadwick A. Bible, 2101 Treverton Pl., Raleigh, N.C. 27609

[21] Appl. No.: 25,364

[22] Filed: Feb. 26, 1993

[51] Int. Cl.$^5$ .................. E01H 1/04; B01D 21/18
[52] U.S. Cl. ............................ 15/84; 198/731
[58] Field of Search ............ 15/84, 85; 198/731, 198/733, 734; 210/526, 525, 527, 523, 524, 528; 474/226, 224, 230, 231

[56] References Cited

U.S. PATENT DOCUMENTS

| | | | |
|---|---|---|---|
| 2,505,501 | 4/1950 | Miller et al. | 15/84 |
| 4,328,603 | 5/1982 | Dickson et al. | 15/84 |
| 4,441,605 | 4/1984 | Ronco et al. | 198/731 |
| 4,518,077 | 5/1985 | Ronco et al. | 198/731 |
| 4,663,042 | 5/1987 | Rasper et al. | 198/731 |
| 4,754,521 | 7/1988 | Zoni | 15/84 |
| 4,950,398 | 8/1990 | Wiegand et al. | 198/731 |
| 5,060,334 | 10/1991 | Strauser et al. | 15/84 |

OTHER PUBLICATIONS

Athey Products Corporation-M-9 Operator's & Service Manual-Cover Page, pp. 1—1, 3-14, 3-15, 4-12, 4-13, 4-14.
Athey Products Corporation-Specifications Model H-10A, TE-4D, AHL, H-10, TE-3D no date.
Athey Products Corporation-Model M-9A-Built Street Smart no date.
Athey Products Corporation-"Athey"-Form No. TEB 10-84 5M.
Athey Products Corporation-"Elevator Chain & Flights"-May 4, 1984.
Rexnord Corporation-R85 Catalog-p. C-59.

*Primary Examiner*—David A. Scherbel
*Assistant Examiner*—Reginald L. Alexander
*Attorney, Agent, or Firm*—Michael, Best & Friedrich

[57] ABSTRACT

Disclosed herein is a chain for use in a street sweeper in conveying dirt swept from the street along an inclined surface to a hopper for later disposal. Flights for conveying the dirt along the inclined surface are easily attached to the chain. The chain is of an offset configuration and is run open end forward. The offset configuration run open end forward results in less chain and sprocket wear than prior art straight sidebar configurations. Chain components are carbonitrided for high hardness. The distance the flights can be pivoted from the surface they contact is limited by strategic location of flight attachment portions of sidebars. Assembly is simplified.

16 Claims, 4 Drawing Sheets

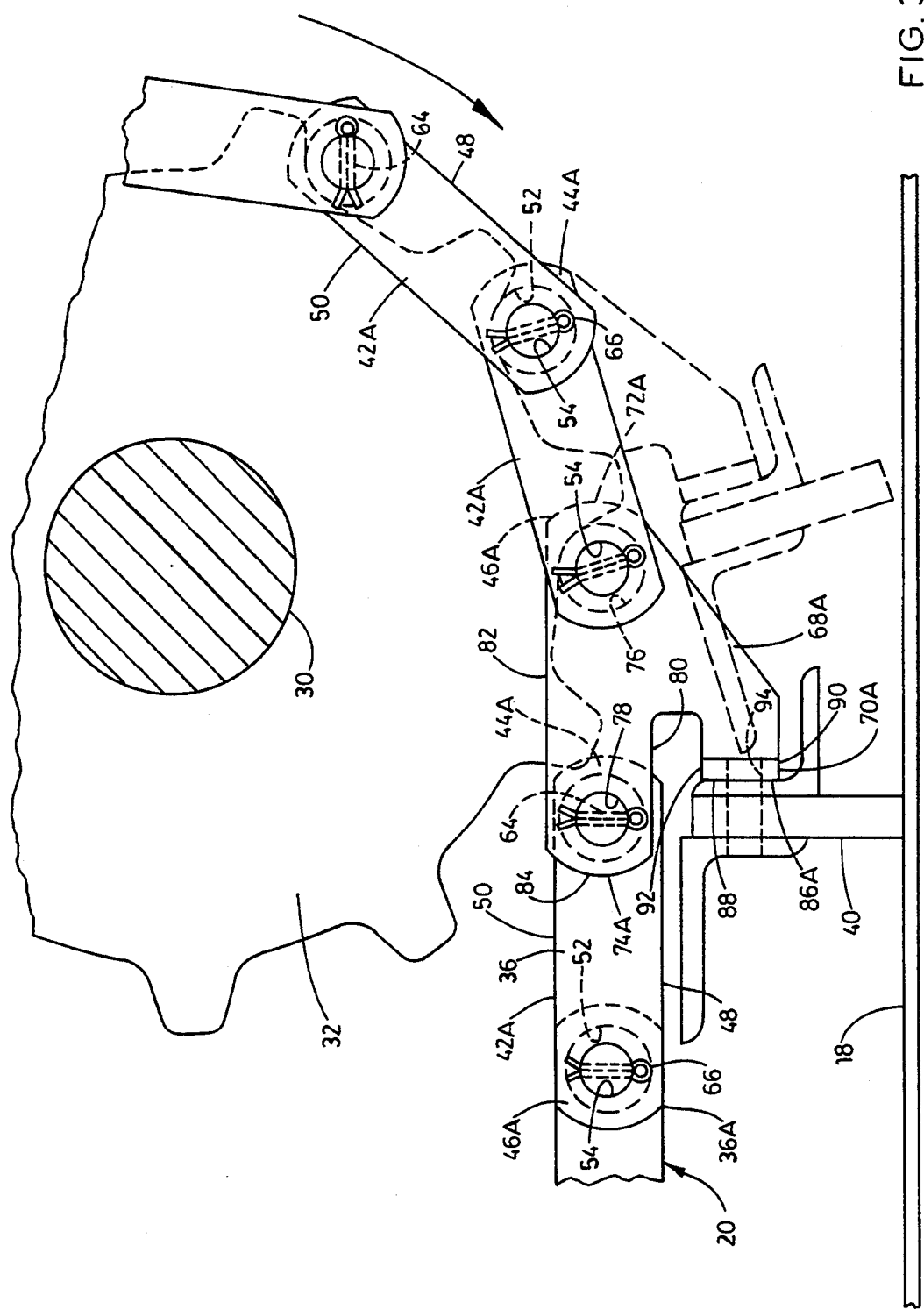

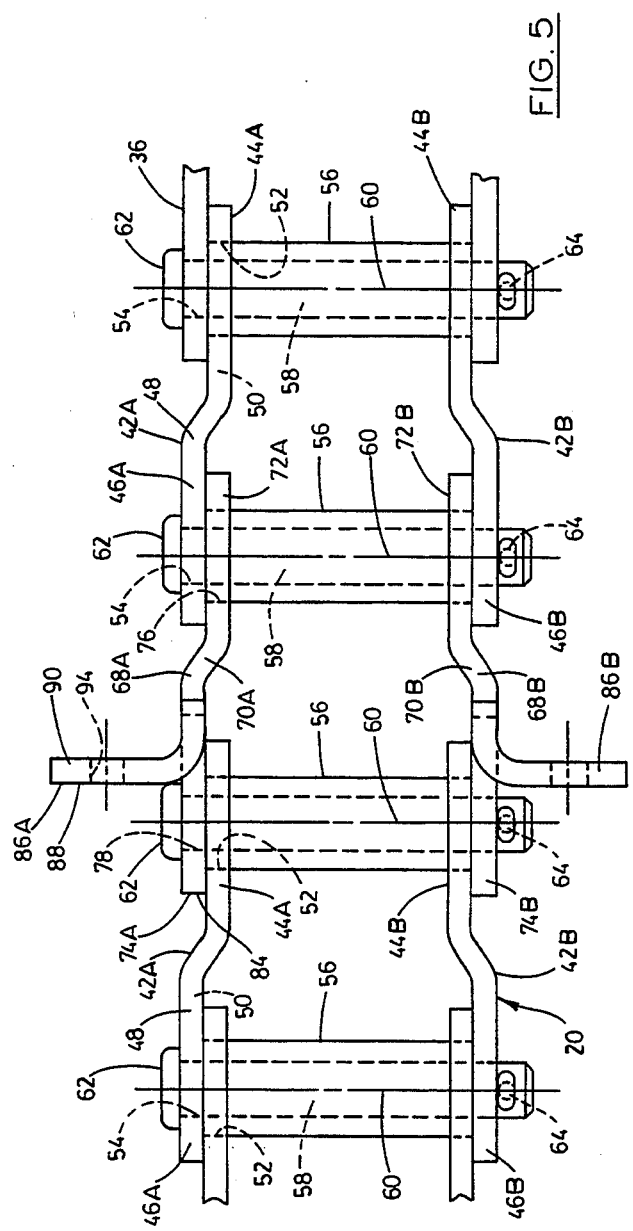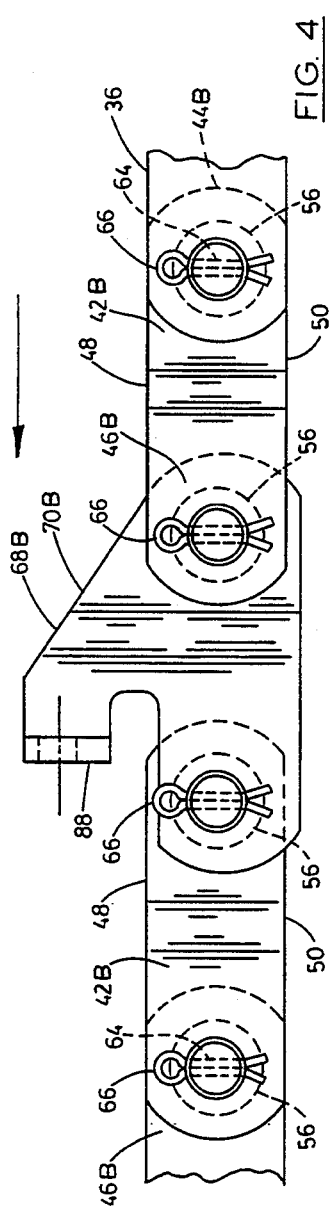

OFFSET SIDEBAR FLIGHT SUPPORTING CHAIN

FIELD OF THE INVENTION

The invention relates generally to chains and, more particularly, to chains having flight attachments.

BACKGROUND OF THE INVENTION

Street sweepers include a rear brush which selectively is put in contact with a street and caused to rotate so as to sweep dirt from the street to a chain assembly which conveys the street dirt along an inclined surface, upwardly at an angle into a hopper.

A problem with prior art sweeper chain assemblies is that they are composed of many separate components, and are expensive to assemble. One prior art chain assembly includes a pair of parallel spaced apart straight sidebar chains. Each chain comprises a plurality of pairs of chain sidebars connected together by chain pins. Selected pairs of sidebars have flight attachments, extending away from each other, respectively including a surface normal to the rest of the sidebar. The flight attachments have bores extending therethrough, which bores have respective axes normal to the direction of chain travel. The axis of each bore through the flight attachments is mid way between chain pin holes of the associated sidebar. A planar, elongated, pusher bar or squeegee is sandwiched between two elongated angle irons and is bolted to the angle irons. One of the angle irons has spaced apart brackets which bolt to the flight attachments of the parallel spaced apart chains so that the pusher bar or squeegee extends perpendicularly to the direction of chain travel and is supported by the parallel spaced apart chain. Other pusher bars or squeegees are similarly mounted to other flight attachments so that there are a plurality of transversely extending flights secured to the parallel chains at selected sequential positions along the chains. The chain assembly conveys street dirt upwardly at an angle into a hopper.

Chains in street sweepers are operating in abrasive environments, and are subjected to wear.

A problem with using straight sidebar chains is that friction between chain pins and bushings causes elongation of such chains, resulting in sprocket teeth being jumped which causes skewing of the pusher bars extending between the parallel, spaced apart chains. Another problem with using straight sidebar chains is that wear at the interfaces of the bushing outer diameters and the sprocket tooth faces causes improper chain-sprocket interaction.

SUMMARY OF THE INVENTION

The invention provides a chain to which flights can easily be attached. Assembly is simplified.

One embodiment of the invention provides a street sweeper including a hopper for housing dirt until a disposal site is reached, an inclined surface leading to the hopper, a chain assembly for conveying dirt along the inclined surface to the hopper, and a rear brush which selectively is put in contact with a street and caused to rotate so as to sweep dirt from the street to the dirt receiving surface. The chain assembly includes a pair of parallel spaced apart offset sidebar chains run open end forward. By employing offset chains run open end forward, there is less chain elongation and less chain and sprocket wear than if prior art straight sidebar configurations were used. Each chain comprises a plurality of pairs of chain sidebars connected together by chain pins. Selected pairs of sidebars include flight attachment portions for engaging flights for conveying the dirt along the inclined surface.

In one embodiment of the invention, the flight attachment portions are integral with respective offset sidebars.

In one embodiment of the invention, chain components are carbonitrided for high hardness.

In another embodiment of the invention, the distance that flights can be pivoted from the surface they contact is limited by strategic location of flight attachment portions of sidebars for an aggressive pushing action.

Other features and advantages of the invention will become apparent to those of ordinary skill in the art upon review of the following detailed description, claims, and drawings.

DESCRIPTION OF THE DRAWINGS

FIG. 3 is a sectional view taken along line 3—3 in FIG. 2.

FIG. 4 is a broken away side view showing the chain assembly of FIG. 3.

FIG. 5 is a broken away top plan view showing the chain assembly of FIG. 1.

DETAILED DESCRIPTION OF THE PREFERRED EMBODIMENT OF THE INVENTION

Figure 1:
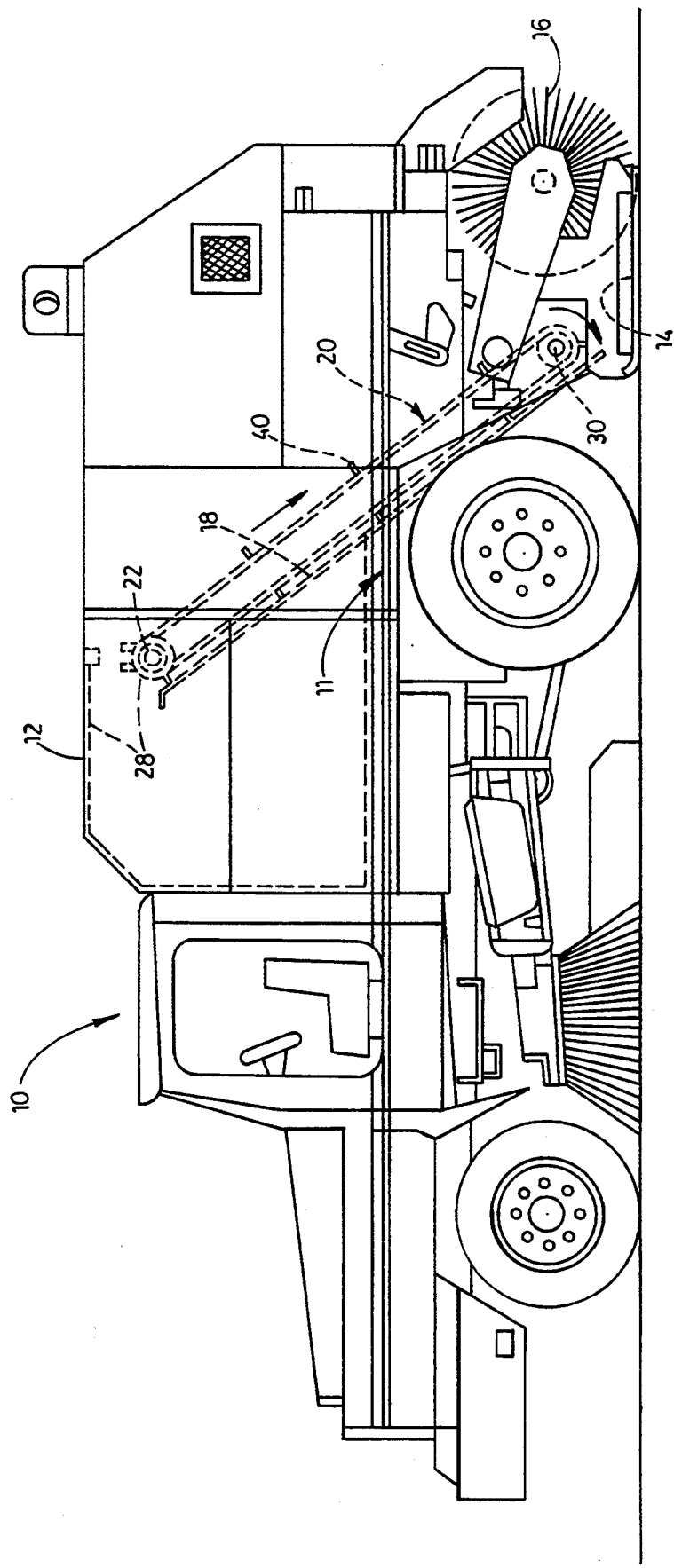
FIG. 1 is a side elevational view of a street sweeper embodying various features of the invention.
Figure 2:
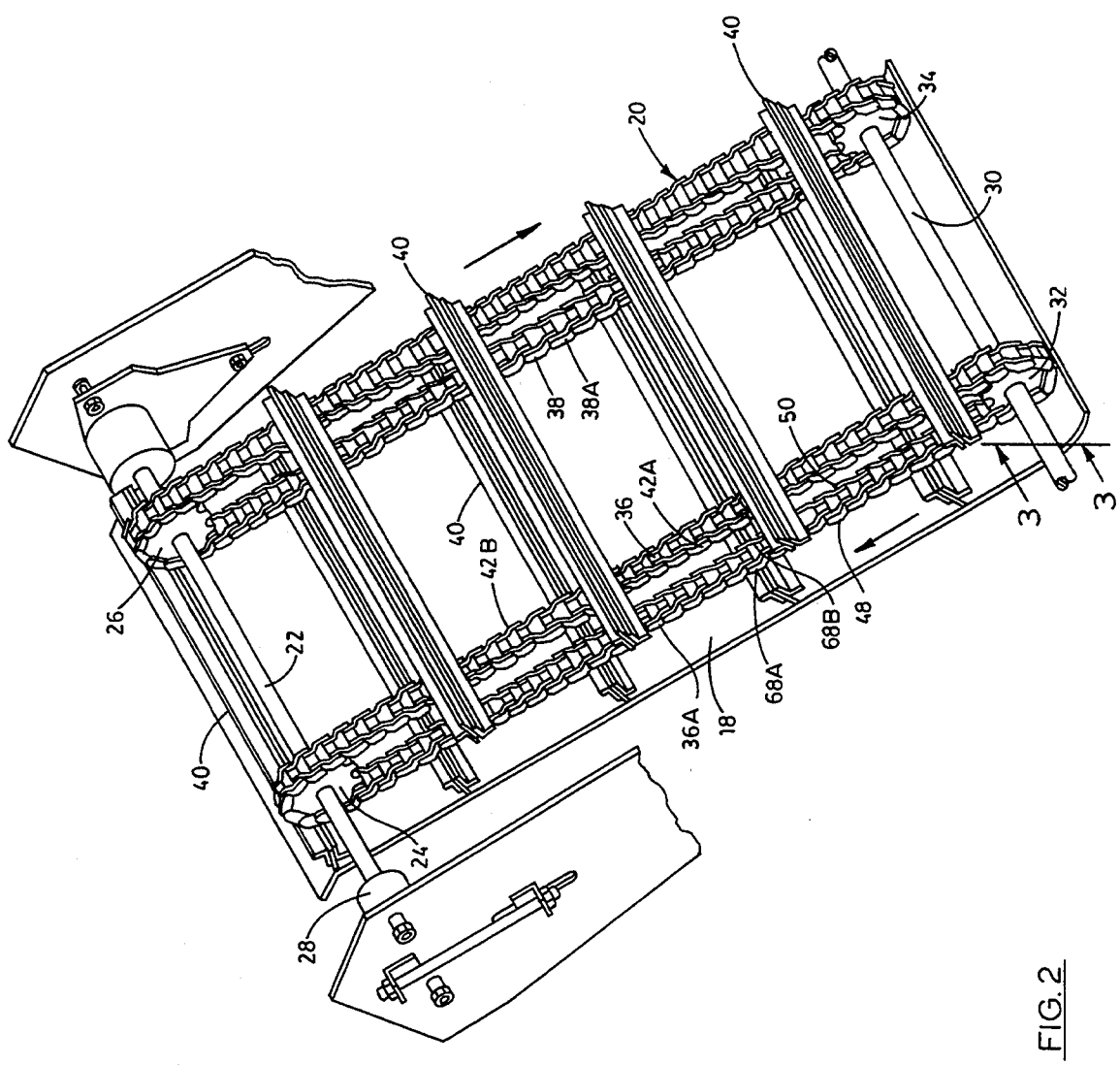
FIG. 2 is a partially broken away perspective view of a chain assembly included in the street sweeper of FIG. 1.

Shown in the various figures is a mobile street sweeper 10 for removing dirt from a street surface for disposal. The street sweeper 10 includes a vehicle frame 11, suspension, wheels, an internal combustion engine, and other standard vehicle components which will not be discussed here in any detail. The frame 11 supports a hopper 12 for housing dirt collected from street surfaces until the hopper is conveyed to a site where it can be emptied of dirt. At least a portion of the hopper 12 has the general shape of a box with an upper open end. The street sweeper 10 includes an inclined surface 18, supported by the frame, which receives dirt swept up from a street. The street sweeper 10 includes a rear brush 16, supported by the frame 11, which selectively is put in contact with a street surface and is caused to rotate in a counterclockwise direction if viewed from FIG. 1, so as to sweep dirt from the street to a lower portion of the inclined surface 18. The inclined surface 18 leads to an upper open end of the hopper 12, and dirt is conveyed upwardly along the surface 18 to the hopper 12. The street sweeper 10 further includes drag shoes 14, supported by the vehicle frame, on either side of the brush 16 for preventing dirt from being thrown laterally of the street sweeper 10.

The street sweeper 10 further includes a chain assembly 20 for conveying dirt into the hopper 12 along the inclined surface 18. The street sweeper 10 also includes a laterally extending upper shaft 22 mounted for rotation at a location proximate and parallel to the rear edge of the upper open end of the hopper 12, and supporting a pair of spaced apart sprockets 24 and 26, respectively, for rotation with the upper shaft 22. A motor 28 is connected to the upper shaft to cause rotation of the upper shaft 22 about its axis. The street sweeper 10 also includes a laterally extending lower shaft 30 mounted for rotation at a location proximate to a lower edge of the inclined surface 18, and supporting a pair of spaced apart sprockets 32 and 34 which are aligned with the sprockets 24 and 26, respectively. It will be appreciated by one of ordinary skill in the art that wheels could be substituted for the sprockets 24 and 26 or 32 and 34.

The chain assembly 20 includes a pair of parallel spaced apart offset sidebar steel chains 36 and 38. The chain 36 is an endless chain and is looped around the sprockets 24 and 32 to run open end forward. That is, the chain 36 is looped around the sprockets 24 and 32 in an orientation such that a portion 36A of the loop closest to the inclined surface 18 is oriented to run open end forward to the hopper 12. The chain 38 is also an endless chain, and is looped around the sprockets 26 and 34 in an orientation such that a portion 38A of the loop closest to the inclined surface 18 is oriented to run open end forward to the hopper 12.

An offset sidebar chain construction was chosen because it has been determined that such a construction, run open end forward, results in less bushing and sprocket wear.

The chain assembly 20 further includes a plurality of laterally extending flights 40, which are squeegees in the illustrated embodiment, secured to the endless chains 36 and 38 at selected sequential locations along the chains 36 and 38. The motor 28 is arranged so as to selectively cause rotation of the upper shaft 22 in the direction which results in the chain loop portions 38A and 36A being run open end forward to the hopper 12. Thus, the chain assembly 20 is employed to convey dirt to the hopper 12 along the inclined surface 18.

The illustrated chains 36 and 38 are identical, and only the chain 36 will be described in detail.

The chain 36 includes a plurality of pairs of opposed, offset, sidebars 42A and 42B. Each sidebar 42A is an integral piece including an inner sidebar portion 44A and an outer sidebar portion 46A. Each sidebar 42B is an integral piece including an inner sidebar portion 44B and an outer sidebar portion 46B. Thus, each pair of sidebars 42A and 42B is defined by a pair of opposed inner sidebar portions 44A and 44B and a pair of opposed outer sidebar portions 46A and 46B. Each sidebar 42B is symmetric to an opposed sidebar 42A, and thus only the sidebars 42A will be described henceforth. Each sidebar 42A has a lower edge 48, which faces the inclined surface 18 when that sidebar 42A defines a part of the loop portion 36A, and an upper edge 50, parallel to the lower edge 48, which upper edge 50 faces away from the inclined surface 18 when that sidebar 42A defines a part of the loop portion 36A. Each inner sidebar portion 44A has therethrough an aperture 52, and each outer sidebar portion 46A has therethrough an aperture 54 having a diameter smaller than the diameter of the aperture 52.

The chain 36 further includes a tubular bushing 56 supported by each pair of opposed inner sidebar portions 44A and 44B. Each bushing 56 is supported by one pair of inner sidebar portions 44A and 44B such that the opposite ends of the bushing 56 are respectively housed in the apertures 52 through the inner sidebar portions 44A and 44B. Each aperture 54 through the outer sidebar portions 46A and 46B has a diameter smaller than the outer diameter of the bushing 56 so that the bushing 56 cannot pass through the apertures 54 of the outer sidebar portions 44A and 44B that are connected to the inner sidebar portions 44A and 44B.

The chain 36 further includes a plurality of pins 58. Each pin 58 extends through a bushing 56 and through the apertures 54 of an opposed pair of outer sidebar portions 46A and 46B which apertures 54 are aligned with the bushing 56, so as to form chain joints connecting pairs of inner sidebar portions 44A and 44B with pairs of outer sidebar portions 46A and 46B. The pins 58 and bushings 56 are carbonitrided for high hardness.

Each pin 58 has a longitudinal axis 60, an end having a head 62 abutting the outer side of an outer sidebar portion 46A, and an opposite end having therethrough a cotter pin hole 64 transverse to the longitudinal axis 60. The chain 36 further includes a cotter pin 66 through each cotter pin hole 64 and abutting the outer side of an outer sidebar portion 46B. Alternative chain pin structures can be employed which may or may not involve the use of cotter pins.

The chain 36 further includes, at selected sequential locations along the chain, a pair of opposed offset sidebars 68A and 68B in place of sidebars 42. Each sidebar 68A and 68B has an integral flight attachment portion 70A and 70B, respectively, for supporting a flight 40. Each sidebar 68A is an integral piece including an inner sidebar portion 72A, and an outer sidebar portion 74A, in addition to the flight attachment portion 70A. Each sidebar 68B is an integral piece including an inner sidebar portion 72B, and an outer sidebar portion 74B, in addition to the flight attachment portion 70B. Thus, each pair of sidebars 68A and 68B includes a pair of opposed inner sidebar portions 72A and 72B and a pair of opposed outer sidebar portions 74A and 74B. The sidebars 68A are symmetric to the sidebars 68B and, thus, only the sidebars 68A will be described in detail henceforth. Each inner sidebar portion 72A has therethrough a rear aperture 76, and each outer sidebar portion 74A has therethrough a forward aperture 78 having a diameter smaller than the diameter of the aperture 76. The outer sidebar portion of each sidebar 68A has a lower edge 80, which faces the inclined surface 18 when that sidebar 68A defines a part of the loop portion 36A, and each sidebar 68A has an upper edge 82, parallel to the lower edge 80, which upper edge faces away from the inclined surface 18 when that sidebar 68A defines a part of the loop portion 36A.

While other configurations may be employed, in the illustrated embodiment the upper edge 82 would be located farther away from the inclined surface 18 than the upper edge 50 of an adjacent sidebar 42A, and the lower edge 80 would be located farther away from the inclined surface 18 than the lower edge 48 of an adjacent sidebar 42A, if the chain 36 were completely taut and the sidebar 68A defined a part of the loop portion 36A. (In actual use there would obviously be some slack in the chain 36). While other configurations may be employed, in the illustrated embodiment the aperture 78 is located closer to the lower edge 80 than to the upper edge 82. The aperture 76 is located the same distance from the upper edge 82 as is the aperture 78. While other configurations may be employed, in the illustrated embodiment each sidebar 68A has a leading edge 84 having a center of curvature located at the center of the aperture 78.

The flight attachment portion 70 of each sidebar 68A includes a wing portion 86A which extends perpendicularly to the outer sidebar portion 74A (i.e. which extends in a direction parallel to the longitudinal axis 60), and which extends away from a symmetrical wing portion 86B of the opposed sidebar 68B of the pair of sidebars. The wing portion 86A includes a surface 88 that is perpendicular to the direction of chain travel, that has a lower edge 90 which faces the inclined surface 18 when the sidebar 68A defines a portion of the loop portion 36A, and that has an upper edge 92 which faces away from the inclined surface 18 when the sidebar 68A defines a portion of the loop portion 36A. The surface 88 lies on a plane that intersects the bushing 56 that surrounds the chain pin 58 passing through the aperture 78 of the sidebar 68A. The upper edge 92 of the wing portion 86 is spaced from and is located closer to the inclined surface 18 than the lower edge 80 of the outer sidebar portion 74A when the sidebar 68A defines a part of the loop portion 36A. The upper edge 92 of the wing portion 86 would be spaced from and located closer to the inclined surface 18 than the lower edge 48 of an adjacent sidebar 42A, if the chain 36 were completely taut and the sidebar 68A defined a part of the loop portion 36A.

The wing portion 86 has therethrough an aperture 94 for receiving a fastener so that the flights 40 can be secured to the chains 36 and 38, against the surfaces 88, in an orientation normal to the direction of chain travel of both of the chains 36 and 38. The chain assembly 20 is arranged so that the flights 40 contact the inclined surface 18 and convey dirt to the hopper 12 along the inclined surface 18.

The surface 88 on the wing portion 86 is located, with respect to the direction of chain travel, between the apertures 76 and 78 and, more particularly, close to the aperture 78 so that the flight 40, when secured to the wing portion 86, is aligned with the aperture 78 with respect to the direction of chain travel.

The distance the flights 40 can be pivoted from the surface they contact is limited by this forward location of the flights. This is because when a flight 40 encounters an obstacle, there is a maximum angle that a sidebar 68A or 68B can pivot about the chain pin 58 through the aperture 78. This maximum angle will be determined by the tautness of the chain 36. For a given maximum pivot angle, the distance that the flight 40 will be displaced from its normal location, in a direction perpendicular to the direction of chain travel and perpendicular to the longitudinal axis 60, is less with the flight 40 located proximate the aperture 78 than it would be if the flight 40 was located proximate the aperture 76. The forward location of the flight 40, directly below the pin 58 (in FIG. 3) results in aggressive pushing by the flights 40.

No rollers are employed in the chain 36 (or the chain 38). Thus, the bushings 56 of the chains 36 and 38 come into direct contact with sprockets.

Thus, a street sweeper chain is provided to which flights can easily be attached. The chain is of an offset configuration and is run open end forward. The offset configuration run open end forward results in less chain and sprocket wear than prior art straight sidebar configurations. Chain components are carbonitrided for high hardness. The distance the flights can be pivoted from the surface they contact is limited by strategic location of the wing portions 86 of the sidebars 68 having flight attachment portions. Assembly is simplified.

While a preferred embodiment of the invention has been described, various modifications are possible. It is to be understood that the disclosed chain has applications other than for use in street sweepers. Thus, the scope of the invention is to be limited only by the scope and spirit of the following claims.

We claim:

1. A mobile street sweeper comprising:
   a frame;
   a surface supported by said frame and adapted to have dirt conveyed thereon; and
   a chain assembly, supported by said frame, including a pair of spaced apart, parallel, chain loops, each of said chain loops including a plurality of pairs of opposed, spaced apart offset sidebars, each sidebar having a forward end having therethrough a forward aperture and having a rearward end having therethrough a rearward aperture, the forward ends of pairs of sidebars being connected to the rearward ends of sidebars of adjacent pairs by chain pins, the forward ends being spaced apart by a greater distance than the rearward ends of each pair of sidebars, each chain pin defining a longitudinal axis, said chain assembly further including, a bushing surrounding each chain pin, and, at sequential locations along said chain loops, laterally extending flights supported by said pair of chain loops, said frame locating said chain assembly such that said flights travel along said surface to convey dirt along said surface, certain of said pairs of sidebars of each of said chain loops, at sequential locations along said chain loops, having integrally formed flight attachment portions supporting said flights, the flight attachment portion including a wing portion which extends in a direction parallel to each of said longitudinal axes, and which wing portion extends away from the opposed sidebar of the pair of sidebars and is spaced apart from, separate from, and independent from said opposed sidebar of the pair of sidebars, each of said wing portions including a flight engaging surface which defines a plane that is perpendicular to the direction of chain travel and that, if extended, would intersect the bushing surrounding the chain pin passing though the forward apertures of the pair of sidebars, at least one of said flight engaging surfaces having therethrough a bore for bolting of said flight to said flight engaging surface, said bore being oriented parallel to the direction of chain travel.

2. A mobile street sweeper as set forth in claim 1 wherein each of said sidebars consists essentially of steel.

3. A mobile street sweeper as set forth in claim 1 wherein each of said sidebars has a forward aperture having a chain pin passing therethrough, and a rear aperture having a chain pin passing therethrough, and wherein said wing portions are located such as to position said flights, with respect to a direction parallel to the direction of chain travel, in alignment with said forward aperture of the sidebar having said wing portion, thereby resulting in aggressive pushing of dirt along said surface by said flights.

4. A mobile street sweeper as set forth in claim 1 and further including means for driving each chain of said pair of chain loops, and wherein each chain of said pair of chain loops is driven open end forward with respect to said surface.

5. A mobile street sweeper as set forth in claim 1 wherein each of said chain loops further comprises bushings surrounding said chain pins, and wherein said chain pins and said bushings are hardened by carbonitriding.

6. A mobile street sweeper as set forth in claim 1 wherein said first chain loop further comprises a bushing surrounding each chain pin of said first chain loop, wherein said second chain loop further comprises a bushing surrounding each chain pin of said second chain loop, and wherein said street sweeper further comprises, a first sprocket supported by said frame, a second sprocket spaced apart from and coaxial with said first sprocket and supported by said frame, a third sprocket aligned with said first sprocket and supported by said frame, and a fourth sprocket coaxial with said third sprocket, aligned with said second sprocket, and supported by said frame, wherein a first one of said chain loops is looped between said first and third sprockets, wherein a second one of said chain loops is looped between said second and fourth sprockets, and wherein said bushings of said first chain loop come into direct contact with said first and third sprockets, and wherein said bushings of said second chain loop come into direct contact with said second and fourth sprockets.

7. A mobile street sweeper comprising:
a frame;
a hopper supported by said frame;
a brush supported by said frame for selective rotation in contact with a street;
an inclined surface supported by said frame, having one end located to receive dirt from said brush, having an opposite end proximate said hopper, and adapted to have dirt conveyed thereon from said first end to said opposite end; and
a chain assembly, supported by said frame, including a pair of spaced apart, parallel, chain loops, each of said chain loops including a plurality of pairs of opposed, spaced apart offset sidebars having forward apertures, and rearward apertures, said pairs of sidebars connected together by chain pins respectively simultaneously passing through the forward apertures of one pair and the rearward apertures of an adjacent pair of sidebars, each chain pin defining a longitudinal axis, said chain assembly further including, at sequential locations along said chain loops, flights supported laterally by said pair of chain loops, said frame locating said chain assembly such that said flights travel along said surface to convey dirt along said surface from said first end to said opposite end of said surface, certain of said pairs of sidebars of each of said chain loops, at sequential locations along said chain loops, having flight attachment portions supporting said flights, the flight attachment portion of each sidebar of the pair of sidebars including a wing portion which extends in a direction parallel to each of said longitudinal axes and away from the wing portion of the opposed sidebar of the pair, and which is spaced apart from, separate from, and independent from the wing portion of the opposed sidebar of the pair, each of said wing portions including a flight engaging surface, and each of said flight engaging surface of each of said wing portions defining a plane perpendicular to the direction of chain travel, said wing portions being located such as to position said flights, with respect to a direction parallel to the direction of chain travel, in alignment with said forward aperture of the sidebar having said wing portion.

8. A mobile street sweeper as set forth in claim 7 wherein said sidebars having flight attachment portions are respectively integrally formed with said flight attachment portions.

9. A mobile street sweeper as set forth in claim 7 wherein at least one of said flight engaging surfaces has therethrough a bore for bolting of said flight to said flight engaging surface, said bore being oriented parallel to the direction of travel of the chain which said flight engaging surface comprises.

10. A mobile street sweeper as set forth in claim 7 wherein each of said sidebars consists essentially of steel.

11. A mobile street sweeper as set forth in claim 7 and further including means for driving each chain of said pair of chain loops, and wherein each chain of said pair of chain loops is driven open end forward with respect to said surface.

12. A mobile street sweeper as set forth in claim 7 wherein each of said chain loops further comprises bushings surrounding said chain pins, and wherein said chain pins and said bushings are hardened by carbonitriding.

13. A mobile street sweeper as set forth in claim 7 and further comprising a first sprocket supported by said frame, a second sprocket spaced apart from and coaxial with said first sprocket and supported by said frame, a third sprocket aligned with said first sprocket and supported by said frame, and a fourth sprocket coaxial with said third sprocket, aligned with said second sprocket, and supported by said frame, wherein a first one of said chain loops is looped between said first and third sprockets, wherein a second one of said chain loops is looped between said second and fourth sprockets, and wherein said chain pins of said first chain loop come into direct contact with said first and third sprockets, and wherein said chain pins of said second chain loop come into direct contact with said second and fourth sprockets.

14. A chain comprising a chain link including a pair of offset sidebars adapted to be connected to other links to define a chain, each sidebar having an outer sidebar portion having therethrough a forward aperture, said chain further comprising a chain pin simultaneously passing through said forward apertures and defining a longitudinal axis and a bushing surrounding said chain pin, at least one pair of sidebars having a flight attachment portion including a wing portion which is integral with only one sidebar of the pair of sidebars, which extends in a direction parallel to said longitudinal axes, which includes a flight engaging surface defining a plane perpendicular to the direction of chain travel which plane, if extended, would intersect said bushing proximate said outer sidebar portions of said pair of sidebars having the wing portion, and which wing portion is spaced apart from, and extends away from the opposed sidebar.

15. A chain as set forth in claim 14 wherein each of said sidebars consists essentially of steel.

16. A chain as set forth in claim 14 wherein said bushing and said chain pin are carbonitrided.

* * * * *